United States Patent
Zhou et al.

(10) Patent No.: US 7,636,192 B2
(45) Date of Patent: *Dec. 22, 2009

(54) METHOD, APPARATUS AND SYSTEM FOR COST EFFECTIVE OPTICAL TRANSMISSION WITH FAST RAMAN TILT TRANSIENT CONTROL

(75) Inventors: Xiang Zhou, Holmdel, NJ (US); Martin Birk, Belford, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/424,306

(22) Filed: Jun. 15, 2006

(65) Prior Publication Data

US 2007/0291351 A1    Dec. 20, 2007

(51) Int. Cl.
*H01S 3/00* (2006.01)
(52) U.S. Cl. .................... 359/334; 359/341.43
(58) Field of Classification Search ........... 359/334, 359/341.43
See application file for complete search history.

(56) References Cited

U.S. PATENT DOCUMENTS

| | | |
|---|---|---|
| 6,236,500 B1 | 5/2001 | Suzuki et al. |
| 6,417,965 B1 | 7/2002 | Ye et al. |
| 6,441,950 B1 | 8/2002 | Chen et al. |
| 6,498,677 B1 | 12/2002 | Sun et al. |
| 6,510,000 B1 | 1/2003 | Onaka et al. |
| 6,574,037 B2 | 6/2003 | Islam et al. |
| 6,624,926 B1 | 9/2003 | Hayashi et al. |

(Continued)

FOREIGN PATENT DOCUMENTS

EP    1248 334    10/2002

OTHER PUBLICATIONS

Yihong, Chen et al., "Bi-directionally pumped broadband Raman amplifier," ECOC, Sep. 2001, pp. 230-231, Freehold, NJ.

(Continued)

*Primary Examiner*—Mark Hellner
(74) *Attorney, Agent, or Firm*—Banner & Witcoff, Ltd.

(57) ABSTRACT

A method for cost-effective optical transmission with fast Raman tilt or other transient event control uses a combination of Erbium-doped fiber amplifiers (EDFAs) and Raman fiber amplifiers (RFAs), where EDFAs are used as the primary optical amplifiers to compensate the span loss while the RFA (advantageously a forward-pumped RFA) is used only in some specific spans with a feed-forward control circuit serving as a fast Raman tilt transient compensator, the RFA also serving as an optical amplifier. A long haul optical transmission system using feed-forward controlled RFA's periodically spaced along its length, for example, when add-drop multiplexing is used, makes full use of the economics of EDFAs and the fast tilt transient control capability of a RFA enabled by an adjustable speed feed-forward or feed-back control technique. In addition, the introduced RFA also performs a dynamic gain equalization function which may eliminate the need or at least reduce the number of standalone dynamic gain equalizers which are required for an ultra-long-haul (ULH) WDM system to compensate for tilt. The invention is also applicable to the common EDFA/Raman hybrid systems and to some all-Raman systems where backward-pumped RFAs are used at each span to enhance Raman transient event control speed.

17 Claims, 9 Drawing Sheets

U.S. PATENT DOCUMENTS

| | | | |
|---|---|---|---|
| 6,661,570 B2 * | 12/2003 | Nakaji | 359/341.41 |
| 6,690,504 B1 | 2/2004 | Nagel et al. | |
| 6,791,745 B2 * | 9/2004 | Goobar et al. | 359/341.41 |
| 6,798,567 B2 * | 9/2004 | Feldman et al. | 359/341.42 |
| 6,958,856 B2 | 10/2005 | Inoue et al. | |
| 6,975,449 B1 * | 12/2005 | Mok et al. | 359/341.41 |
| 6,985,284 B2 * | 1/2006 | Denkin et al. | 359/334 |
| 7,038,843 B2 | 5/2006 | Denkin et al. | |
| 2002/0044343 A1 | 4/2002 | Manzur | |
| 2002/0186456 A1 | 12/2002 | Inoue et al. | |
| 2003/0210457 A1 | 11/2003 | Emori et al. | |
| 2004/0052453 A1 | 3/2004 | Mao et al. | |

OTHER PUBLICATIONS

Kado, Soko et al., "Broadband flat-noise Raman amplifier using low-noise bi-directionally pumping sources," ECOC, 2001, pp. 1-2, Kanagawa, Japan.

Essiambre, Rene-Jean et al. "Design of Bidirectionally Pumped Fiber Amplifiers Generating Double Rayleigh Backscattering," IEEE Photonics Technology Letters, Jul. 2002, pp. 914-916, vol. 14, No. 7, USA.

Bromage, J. et al., "High co-directional Raman gain for 200-km spans, enabling 40×10.66 Gb/s transmission over 2400 km," OFC, 2003, pp. PD24-1 to PD24-3, Holmdel, NJ.

Chen, C.J. et al., "Control of transient effects in distributed and lumped Raman amplifier," Electronic Letters, Oct. 2001, pp. 1304-1305, vol. 37, No. 21, USA.

Wang, L.L., et al., "Gain transients in co-pumped and counter-pumped Raman amplifiers," IEEE Photonics Technology Letters, May 2003, pp. 664-666, vol. 15, No. 5, USA.

Zhou, Xiang et al., "Theoretical investigation of fiber Raman amplifier eith dynamic gain control", OFC, 2001, pp. WDD17-1-WDD17-3, Singapore.

Bolognini, G. et al., "Transient effects in gain-clamped discrete Raman amplifier cascades", IEEE Photonics Technology Letters, Jan. 2004, pp. 66-68, vol. 16, No. 1, USA Zhou, Xiang et al., "Submicrosecond Transient Control for a Forward-Pumped Raman Fiber Amplifier", IEEE Photonics Technology Letters, 2005, pp. 2059-2061, vol. 17, No. 10, USA.

Zhou, Xiang et al., "A new technique for dynamic gain profile control in a multi-wavelength backward-pumped discrete Raman amplifier", 2001, pp. 1-3, USA.

Kim, Pilhan et al. "Semianalytic Dynamic Gain-Clamping Method for the Fiber Raman Amplifier", IEEE Photonics Technology Letters, Apr. 2005, pp. 768-770, vol. 17, No. 4, USA.

Zhou, Xiang et al. "Fast, low-cost method for control of gain and tilt transients in a forward-pumped Raman amplifier", Sep. 2005, USA.

* cited by examiner

METHOD, APPARATUS AND SYSTEM FOR COST EFFECTIVE OPTICAL TRANSMISSION WITH FAST RAMAN TILT TRANSIENT CONTROL

TECHNICAL FIELD

The invention relates to the field of long haul, multi-channel fiber optic transmission systems, and, more particularly, to a system in which a transient event in such systems, especially a tilt transient, is controlled by the periodic application of Raman amplifiers with feed-forward or feedback gain control in a hybrid rare earth doped/Raman optical amplifier end-to-end transmission system.

BACKGROUND OF THE INVENTION

Amplification in optical fiber transmission systems using rare earth doped optical fiber amplifiers, such as, for example, erbium doped fiber amplifiers (EDFA) has been implemented widely due to the advantageous economics and wideband multi-channel operation of such amplifiers. In such an optical transmission system, inter-channel stimulated Raman scattering (SRS) may result in a tilted gain characteristic across the wavelength division multiplexed (WDM) channels (denoted as Raman tilt hereafter) by externally supplied Raman pump radiation using the Raman pumps to add Raman gain. Tilt is the well known transmission impairment characterized by increased power consumption at decreasing wavelength (increasing frequency). Without compensation for tilt, such an effect accumulates span by span and results in serious optical signal to noise ratio (OSNR) degradation in the shorter-wavelength channels and serious nonlinear penalty in the longer-wavelength channels. In a traditional point-to-point WDM system, it is known to compensate for Raman tilt due to inter-channel SRS in the transmission fiber by adding a static tilt compensator after every span. But optical communication is evolving from current point-to-point systems (in which there are no intermediate add/drop points) to dynamic optical networks, in which channels will be added and dropped at intermediate points in the end-to-end system by using, for example, known remotely reconfigurable optical add/drop multiplexers (ROADM) to meet the varying capacity demands. A typical 80 channel C-band WDM system using a single mode fiber as the transmission fiber of, for example, a span length of twenty spans can contribute 1 dB of tilt per span across C-band or a cumulative 20 dB of Raman tilt will be present in such a long haul system. (Raman tilt can be even higher when nonzero-dispersion shifted fibers are used as the transmission fibers).

FIG. 1 is an illustration of an exemplary fiber optic amplifier system having a transmission fiber (Trans. Fiber) 100-1 followed by a first Erbium doped fiber amplifier (EDFA). In the drawings, similar reference numerals will be used to denote similar elements and the first number of a given reference numeral indicates the number of the figure where that element first appears. A dispersion compensation fiber (DCF) 102 separates the first EDFA 101-1 from a second Erbium doped fiber optic amplifier 101-2. A reconfigurable optical add/drop multiplexer (ROADM) 103 is shown following the second EDFA 101-2 for adding and dropping channels. Adding and dropping channels causes transient events, for example, tilt transients. These events, if left uncompensated, create transmission degradation. Depending on the wavelengths dropped and added, a fast transient event occurs, typically, in the form of a transmission degrading tilt transient. Referring to FIG. 1, also, accidental loss of channels due to a transmission fiber cut or a component failure of one of the components such as an EDFA or the DCF 102 in front of an ROADM 103 will also lead to a sudden change in channel count and transient events such as tilt transients. Therefore, there will be a resulting change of the overall optical power in a link following an ROADM node. Of course, the purpose of an ROADM is to add and to drop channels which can likewise result in a change of overall optical power. The strong reduction/increase of total launch power into the transmission fiber section (Trans. Fiber) 100-2 following the ROADM 103 will result, for example, in a substantial reduction/increase of Raman tilt.

As is shown in FIG. 1, the respective channel patterns 1 and 2 shown after ROADM 103 will exhibit tilt in their spectral powers across their bandwidth as represented by the same channel patterns depicted at the output of Trans. Fiber 100-2. The depicted tilt is represented as a smooth sloping line as a general case to show Raman tilt. In the case of co-directional propagation of the signal channels, the transition time of the induced transients are equal to the transition time of the switching events, which can be very fast. As a result, an optical transmission system with fast Raman tilt transients control capability is needed for operating in a dynamic optical network. A "tilt transient" is not shown by way of example in FIG. 2(*b*) where the composite Raman gain profile results in a tilted profile but, depending on the dropped or added wavelengths or the cause of a transient event, the transient event may cause bumps (overshoots and undershoots) in the smooth tilt gain characteristic and thus may be described generally as a transient event and is not one as depicted that specifically results in a smoothly tilted gain profile.

Recently, P. M. Krummrich and inventor Martin Birk, in their article "Compensation of Raman Transients in Optical Networks," presented at OFC 2004, paper MF 82 and their article, "Experimental Investigation of Compensation of Raman-induced Power Transients from WDM Channel Interactions," *IEEE Photonics Technology Letters*, Vol. 17, no. 5, pp 1094-96, May, 2005, suggest adding a standalone dynamic tilt compensator after every span or after a small number of spans into a traditional EDFA system to deal with this problem. In their method, the dynamic tilt compensator is based on a periodically poled LiNbO3 technology with a two-stage design. But such a solution adds considerable cost to the cost of a long haul transmission fiber optic system because the fast dynamic tilt compensator itself is quite expensive. Moreover, one dynamic tilt filter may introduce more than 5 dB of insertion loss into the system. Therefore, the insertion loss of the device will require additional amplification to compensate for the insertion loss which, if the amplification is necessary, will add to the overall system cost.

Also, recently, the inventors have prepared and are filing a number of patent applications directed to dynamic gain control for a fiber optic system as represented by U.S. patent application Ser. Nos. 11/273,868 and 11/274,666 filed Nov. 15, 2005; U.S. patent application Ser. No. 11/424,305 filed Jun. 15, 2006; and U.S. patent application Ser. No. 11/381,244, filed May 2, 2006, all incorporated by reference as to their entire contents. For example, the inventors propose the use of optical amplifiers which are either forward or reverse pumped, RFA's comprising a plurality of Raman pumps that may be controlled by a single control circuit and feed forward and feed backward control circuits and equations and algorithms for their control in combination or used separately. In the specification and claims, a forward Raman pump is a power source that provides power to a signal by a co-propagating signal-pump Raman interaction and a backward Raman pump is a power source that provides power to a signal by counter-propagating signal-pump Raman interaction. A Raman fiber amplifier, either forward or reverse, and an associated dynamic gain control circuit can inherently provide transient tilt control because of their inherent speed.

Apart from a pure EDFA system (no Raman amplification), a hybrid (or combined) end-to-end fiber optical system which includes both EDFA and Raman amplifiers in the system or an all-Raman system have also been widely investigated in recent years. In a known hybrid EDFA/Raman optical system, both EDFA and Raman fiber amplifiers (RFA) (distributed) are used in many or even every span. In an all-Raman system, RFAs (distributed and discrete) are the only optical amplifiers used. In both systems, externally supplied Raman pumps are fed into the transmission fiber 100 at every span; consequently, the signal experiences Raman gain not only from the other signals input to the system but also from the Raman pumps. Because usually more than one Raman pump is needed to obtain a flat gain characteristic over a wide bandwidth and because the power conversion efficiency of a distributed RFA is typically lower than an EDFA, using a distributed RFA at every span results in a considerable cost increase compared to an EDFA only system. Such a cost penalty may outweigh the noise performance gain provided by using distributed RFAs at every span under some circumstances. Consequently, there remains a need in the art for a cost effective approach to the problem of transient event control, especially, tilt transients, due, for example, to channel addition and dropping in a long haul fiber optic system.

SUMMARY OF THE INVENTION

The problems of controlling transient events such as tilt transients in an end-to-end long haul fiber system can be solved by applying a feed-forward gain control technique at a Raman fiber amplifier (RFA) periodically placed in a long haul hybrid or Raman system. In particular, the detrimental tilt transients due to inter-channel SRS in a Raman-amplified WDM system can be suppressed by using an existing multi-wavelength-pumped RFA with a feed-forward dynamic gain control equation and external devices that provide transient event compensation speed adjustment. This is due to the facts that 1) the gain profile of a multi-wavelength-pumped RFA can be easily reconfigured by adjusting the power distribution of different Raman pumps (as will be discussed with reference to FIG. 2); 2) there exist substantial linear relationships in a multi-wavelength-pumped RFA which can be used to simplify the procedure to obtain the proper pump power adjustments under various channel loading conditions, and 3) the response time of an RFA is faster than that of any rare earth doped fiber amplifier such as an EDFA. (A forward-pumped RFA has an almost identical response time as the inter-channel SRS effects, but the response time of an EDFA is much slower than inter-channel SRS effects). Moreover, as the gain equation will demonstrate and according to one embodiment, transient event speed adjustment is provided within the dynamic gain control circuit itself, for example, by determining the propagation time between detection of a transient event and its resolution and incorporating the result into the circuit design via the gain equation. Moreover, in an alternative embodiment, transient event compensation speed may be adjusted using a known fast spectral information monitor in a feed-forward control path. Moreover, a fast channel monitor may be utilized in a feedback control path. Other embodiments will be discussed herein using optical supervisory channels and slow spectrum monitors in a feedback path.

As a result of these investigations and investigations into configuring a hybrid EDFA/Raman amplifier system, an EDFA/Raman hybrid system can be designed to achieve both cost-effective optical transmission as well as fast Raman tilt transient control. According to one aspect, a combination of EDFA and RFA are used in only a small number of spans while EDFAs are used as the predominant optical amplifiers in most of the spans. After several EDFA-only spans, for example, it is suggested to use an RFA (advantageously a forward-pumped RFA) to replace one of the two EDFAs in the following span (two EDFAs per span are required for a typical EDFA system) to perform fast tilt transient control as well as optical amplification. Each RFA is used to control the overall tilt transients generated from multiple spans (advantageously three to six spans). The acceptable accumulated tilt depends on system design criteria such as margin allocation and total span number, but usually should not be greater that 4 or 5 dB for an ultra-long haul WDM system. An introduced RFA also performs the function of the replaced EDFA as an optical amplifier, so such as transmission system is designed to be more cost-effective than systems suggested by Krummrich and others by adding standalone dynamic tilt compensators into an EDFA-only WDM system. This is especially the case if an existing dispersion compensation fiber (DCF) 102 is utilized as the gain medium to construct a discrete RFA recognizing that the DCF 102 has a higher Raman gain coefficient than a typical transmission fiber 100. Consequently, the power conversion efficiency is improved in such a discrete RFA. Moreover, the introduced RFA can also perform a dynamic gain equalization (DGE) function which may eliminate the need or at least reduce the number of standalone DGEs required for an ultra-long-haul (ULH) WDM system. Reducing the use of standalone DGE's also contributes to cost reduction.

These and other features of a hybrid rare earth doped and/or Raman fiber amplifier only long haul fiber optic amplifier system with transient tilt control will become clear from the drawings and the detailed description thereof which follow.

BRIEF DESCRIPTION OF THE DRAWINGS

FIG. 4 shows graphs representing calculated static optical power deviation per channel after four spans of transmission where

DETAILED DESCRIPTION OF EXEMPLARY EMBODIMENTS OF THE INVENTION

Figure 1:
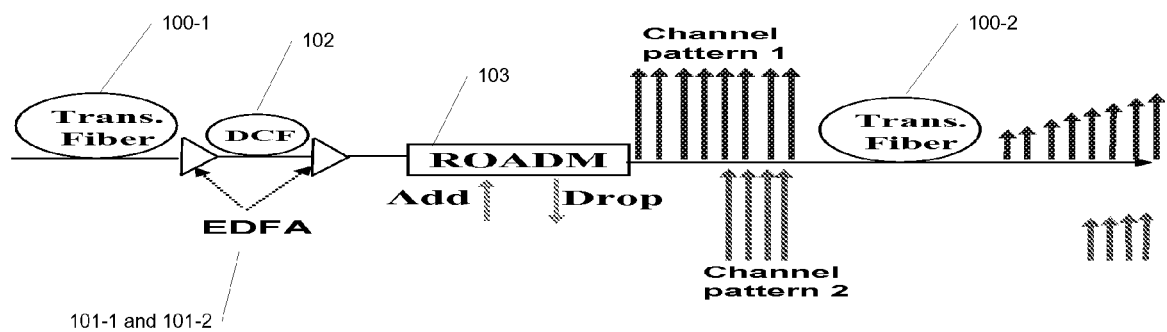
FIG. 1 is a schematic block diagram depicting a multi-span long haul fiber optic transmission system for carrying a plurality of channels in patterns including, primarily, rare earth doped fiber amplifiers such as erbium doped fiber amplifiers (EDFA); the drawing is used to define transient tilt which can dynamically occur due to fiber breaks, component failures and the use of add/drop multiplexers to add and drop channels during long haul transmission.
Figure 2A:
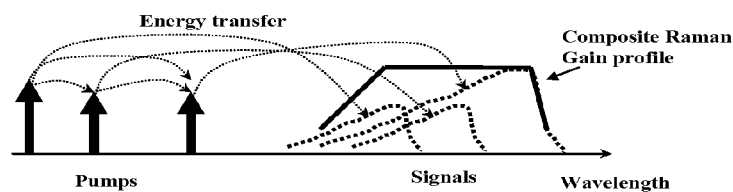
FIG. 2(a) represents a composite Raman gain profile from a plurality of channels in a long haul fiber optic transmission system where there is no transient tilt introduced, for example, by adding or dropping channels and static or dynamic tilt compensation is employed resulting in a flat gain profile.
Figure 2B:
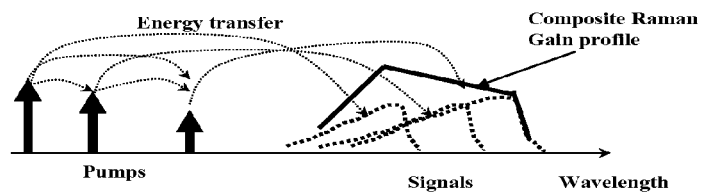
FIG. 2(b), on the other hand, demonstrates different energy at different channels and a tilted composite Raman gain profile results, for example, when no dynamic gain control is provided in cooperation with periodically placed Raman fiber amplifiers (RFA's).

As introduced above, the problems of providing dynamic tilt transient control in a hybrid or Raman only long haul fiber optic system can be solved by introducing periodically a feed-forward control circuit at the location of a Raman amplifier as will be further described with reference to FIGS. 3 through 10 where FIG. 2 shows the impact of adjusting the power distribution of different Raman pumps (RFA's). In particular, in FIG. 2(a), there is shown a flat composite gain profile which is ideally achieved and in the presence of no transient events. According to FIG. 2(b), a tilted composite gain profile is shown by way of example of a transient event that may occur when there is a fiber cut or an add/drop multiplexer event or other component failure. The tilt shown in FIG. 2(b) is shown as a sloping straight line where in reality the line may include one or more overshoots or undershoots depending on the triggering transient event.

Figure 3:
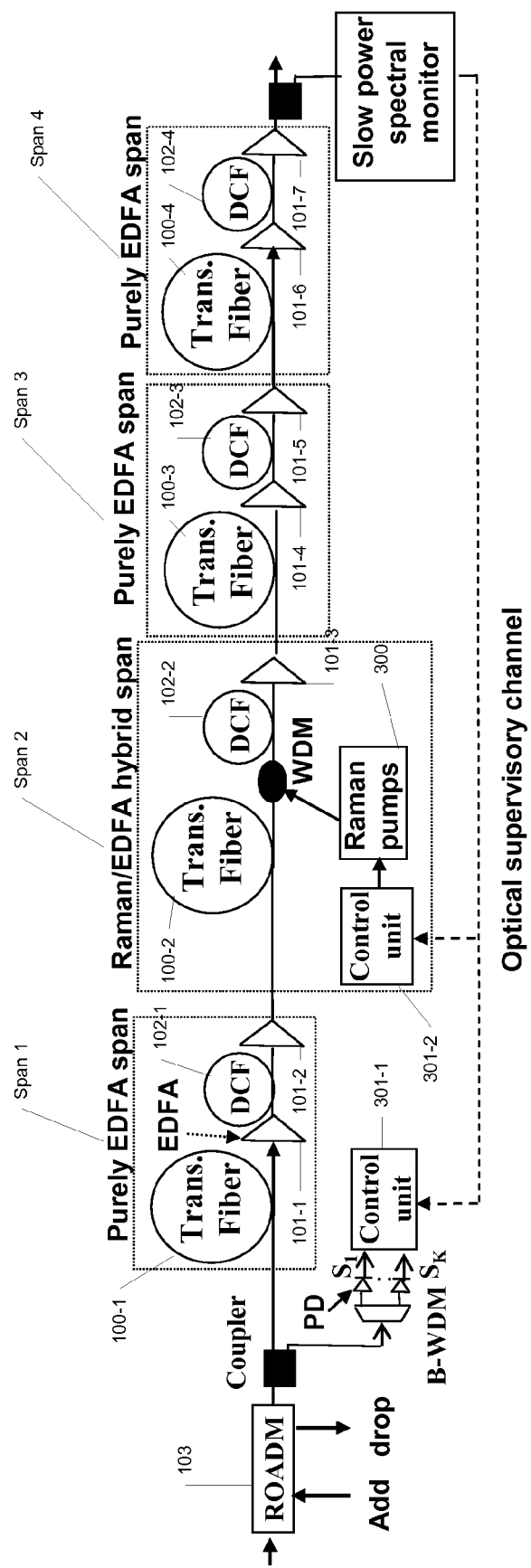
FIG. 3 depicts a schematic block diagram of a first embodiment of the invention using a forward-pumped discrete RFA (Raman pumps) with a feed-forward dynamic gain control circuit (feed-forward signals being remotely monitored from the Raman/EDFA hybrid span) to control the overall Raman tilt transients from multiple spans (the depicted four span system being merely exemplary).

FIG. 3 shows a first embodiment of the invention, in which a forward-pumped discrete RFA (Raman pumps) 300 further comprises a feed-forward dynamic gain control circuit including span 1 circuit 301-1 and span 2 circuit 301-2 connected by an optical supervisory channel to control the overall Raman tilt transients generated from multiple spans of transmission fiber and a dispersion compensation fiber (DCF) 102-1 to 102-4 utilized in each span. In this specific example, four transmission spans following a ROADM 103 are shown. The forward-pumped RFA 300 is shown located at the second span. In an alternative embodiment, the controlled RFA 300 may also be placed in the first span, the third span or the final span as will be further discussed in relation to FIG. 10. Placing the RFA (Raman pumps) 300 in a middle span (i.e. the second span in this example) is an appropriate choice because the noise and nonlinear penalty due to Raman gain tilt may be minimized in such a configuration. For the fast (in the magnitude of microseconds) feed-forward gain control circuit 301-1, 301-2, a small part of the input WDM signal is tapped out at a Coupler before it enters into the transmission fiber (Trans. Fiber) 100-1 of the first span (of the four spans). The tapped-off signal shown from the Coupler is then shown divided into K wavelength regions, $S_1$ through $S_k$, via a band wavelength-division multiplexer (B-WDM) where it enters a first Control Unit 301-1. The total power in each of the K wavelength regions is then detected by a respective photodetector (PD) (to monitor the input signal spectral information). Simulation results have shown that K=2 (tapping off two signal wavelengths) is usually adequate for a typical C/L band WDM system, but K can be chosen to be 1 or greater than 2 depending upon the system requirement. The information about the total input power in each wavelength region, $S_1 \ldots S_K$, is then sent to the second Control unit 301-2 for the RFA (Raman pumps) 300 located at the second span through a common optical supervisory channel (OSC). (A time delay, (not shown in this embodiment) may be introduced in the normal transmission path by inserting a fiber delay line (FDL) in this path to compensate for the required processing time of sending a feed-forward signal in the OSP path). During channel add/drop (caused by device or fiber failures or the add/drop activity of ROADM among other reasons), the power of each of the Raman pumps shown collectively as pumps 300 may be adjusted using the following linear equation $$P_L(j, t) \approx P_{L0}(j) + \sum_{k=1}^{K} T_{LL}(j, k)[S_L(k, t-T) - S_{L0}(k)] \quad \text{EQ. 1}$$

where $P_L(j, t)$ denotes the required pump power in the linear unit of the $j^{th}$ pump at time instant t, $S_L(k, t)$ denotes the detected input signal power in the $k^{th}$ wavelength region also in the linear unit. $S_{L0}(k)$ and $P_{L0}(j)$ denotes the corresponding input signal power and pump power at the reference operation point, e.g. the case with a full load or with a half load. T denotes a time delay between the required pump power adjustment for the discrete RFA and the detected input signal power variation at the monitoring point. Ideally T should be equal to the propagation time of the signal from the monitoring point to the signal-pump WDM located at the second span. $T_{LL}(j, k)$ denotes the linear control coefficient. By way of example and as shown in FIG. 3, T is the measured from the monitoring point location of Coupler to the WDM shown in Span 2. Consequently, transient event compensation speed may be adjusted by using an estimation of T depending on propagation times for intermediate components and the fiber delay between Coupler and WDM. Also, for a specific system design, linear control coefficient $T_{LL}(j, k)$ uniquely depends on the passive optical link parameters such as fiber length, fiber loss and Raman gain coefficient, and therefore can be predetermined either by direct measurement or by numerical simulation using the measured basic optical link parameters.

A simple method for determination of linear control coefficient $T_{LL}(j, k)$ is given as follows. First, we configure the signal channels in such a way that only in the kth wavelength region the detected signal input power is different from a reference point and then measure/calculate the required power adjustment of each Raman pump (to maintain the signal power level per channel at the output of the fourth span to the target level). Let $\Delta P_L(j)$ denote the required static power adjustment of pump j of Raman pumps 300, and $\Delta_L(k)$ the detected static input signal power variation in the kth wavelength region, then we can determine $T_{LL}(j, k)=\Delta P_L(j)/\Delta S_L(k)$.

Apart from the above-mentioned fast feed-forward tilt transient control circuit 301-1, 301-2, a relatively slow (magnitudes of milliseconds or seconds) feedback loop may be also introduced to perform a conventional dynamic gain equalization (DGE) function to reduce the gain ripple that may be accumulated from cascaded EDFAs 101 and polarization-related issues. For this feedback loop, a small part of the output signal power is coupled out at the output of the fourth span and fed back through a relatively slow power spectrum monitor. Such a slow power spectral monitor typically consists of a full-band tunable filter followed by an optical power detector. The output channel power spectral information is then sent back to the control unit 301-2 of the RFA 300 as a feedback signal to control each of the Raman pumps of pumps 300. The conventional proportional-integration-derivative (PID) algorithm or an iterative method based on direct Raman power simulation may be used as the control algorithm for control unit 301-2. A PID (proportional-integral-derivative) based feedback pump power control technique is described, for example, by C. J. Chen et al., "Control of Transient Effects in Distributed and Lumped Raman Amplifier," *Electronic Letters*, pp. 1304-05, October, 2001; L. L. Wang et al., "Gain Transients in Co-pumped and Counter-pumped Raman Amplifiers," *IEEE Photonics Technology Letter, pp.* 664-666, May, 2003, and M. Karasek et al., "Modeling of a Pump-power-controlled Gain-locking System for multi-pump Wideband Raman Fiber Amplifiers," *IEEE Proceedings—Optoelectronics*, pp. 74-80, April, 2004, P. M. Reepschlager et al. (EP 1248334), and C. J. Chen et al. (U.S. Pat. No. 6,441,950) incorporated herein by reference as to their entire contents. This slow feedback gain control loop can also help in reducing residual static error that may accumulate by using a purely feed-forward control technique and help in automatic measurement of the linear control coefficient $T_{LL}(j, k)$ that is required for the forward-forward control circuit 301-1, 301-2, because the required pump power adjustment for different channel patterns can be automatically obtained by using this slow feed-back gain control loop including the slow power spectral monitor. For an ultra-long-haul WDM system with more than one RFA 300 are used, the pump wavelengths at different RFAs may be chosen to be different to enhance the capability of overall gain ripple suppression.

Figure 4A:
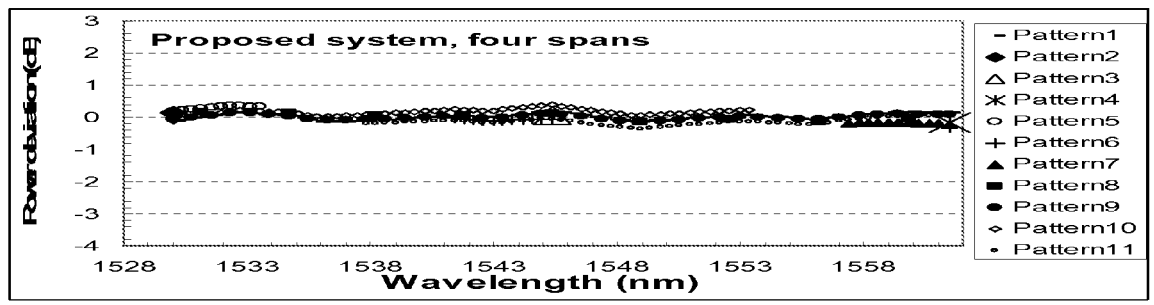
FIG. 4(a) represents a graph showing results for the proposed system of FIG. 3 with only a feed-forward circuit enabled and FIG. 4(b) represents a pure EDFA system without any Raman transient or static tilt control.
Figure 4B:
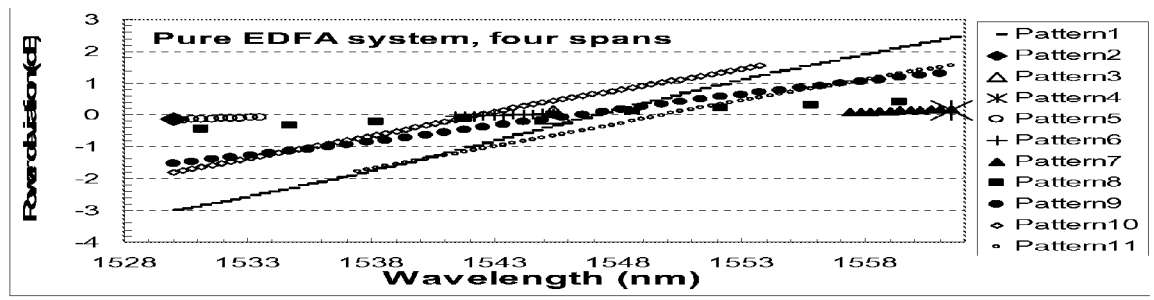

Referring to FIG. 4, FIG. 4(a) numerically demonstrates the effectiveness of the proposed Raman tilt control technique as is shown in the first embodiment of the invention depicted in FIG. 3. FIG. 4 assumes a four-wavelength (1425, 1436, 1452 and 1466 nm) forward-pumped discrete RFA located at the second span of an EDFA system, the RFA being used to compensate the overall Raman tilt generated from the four spans of transmission for an 80-ch 50 GHz-spaced WDM system with input signal power 2 dBm per channel. In each of the depicted four spans, for example, 80 km of standard single mode fiber (SSMF) may be used as the transmission fiber. The DCF 102 for each span may comprise 12 km of DCF as the dispersion compensator. To focus on the Raman tilt, we assume that the depicted EDFA 101 (two of which are shown in each of spans 1, 3 and 4) has an ideal flat gain profile. For the EDFA-only spans, the gains from the first EDFA and from the second EDFA are assumed to be 11 dB and 13 dB, respectively (span loss+DCF insertion loss=23 dB). For the hybrid EDFA/Raman span 2, the gain from the single EDFA 101-3 is 13 dB while the gain from the RFA (Raman pumps 300) varies with the signal patterns. In simulations, polarization-averaged Raman gain coefficient is used to simulate both inter-channel SRS and signal-pump SRS effects. For the feed-forward control circuit 301-1, 301-2, the input signal is divided into two (K='s 2) wavelength regions (1529-1545 nm) and (1545-1561 nm), and we define the full load case (80 channel signals) as the reference point. The 8 linear control coefficients are decided by using two predetermined channel patterns (with only the first 40 channels and with only the final 40 channels) with the procedure described in the prior section. The four linear control equations for an assumed four Raman pumps 300 are found to be $$P(1)=130-0.6675\Delta S(1)-0.33\Delta S(2) \quad \text{EQ. (2)}$$

$$P(2)=98.0-0.5150\Delta S(1)-0.35\Delta S(2) \quad \text{EQ. (3)}$$

$$P(3)=37.4-0.115\Delta S(1)+0.005\Delta S(2) \quad \text{EQ. (4)}$$

$$P(4)=24.5+0.5975\Delta S(1)+0.76\Delta S(2) \quad \text{EQ. (5)}$$

Where P(1), P(2), P(3) and P(4) denote the required pump power (mW) for the four Raman pumps, and $\Delta S(1)$ and $\Delta S(2)$ denote the detected input signal power variations (mW) in the two wavelength regions.

FIG. 4(a) gives the calculated static power deviation per channel after four spans of transmission for 11 distinctive channel patterns based on the above four linear control equations (pattern 1 is the full load case; for the other 10 patterns, the surviving channels range from 1 channel to 60 channels, but the two patterns used for determination of the linear control coefficients are not included in the 10 patterns). One can see that for all the 11 patterns, the maximum power deviations are suppressed to below 0.35 dB by using a purely feed-forward control technique. As a comparison, in FIG. 4(b), we show the calculated power deviations for a purely EDFA system without Raman tilt control. One can see that the maximum power deviation can be up to 3 dB (tilt up to 5.5 dB) after four spans of transmission. As suggested earlier, in a long haul twenty span system, tilt may be on the order of 20 dB across the spectrum.

In the above four-span example, we use one discrete RFA (Raman pumps 300) to control the overall tilt transients and the feed-forward signal (input signal spectral information) is monitored at the input of the first span. For an ultra-long-haul WDM system with many spans (10 or more), more than one RFA 300 are typically required. For this long haul case, a feed-forward signal monitor may be shared by multiple RFAs following the same ROADM 103, i.e. the fast spectral information monitors are only placed in the ROADMs 103 and the monitored output spectral information (out of the ROADM but input of the transmission fiber) is then sent to the downstream RFAs (before another ROADM) as the feed-forward control signal.

Figure 5:
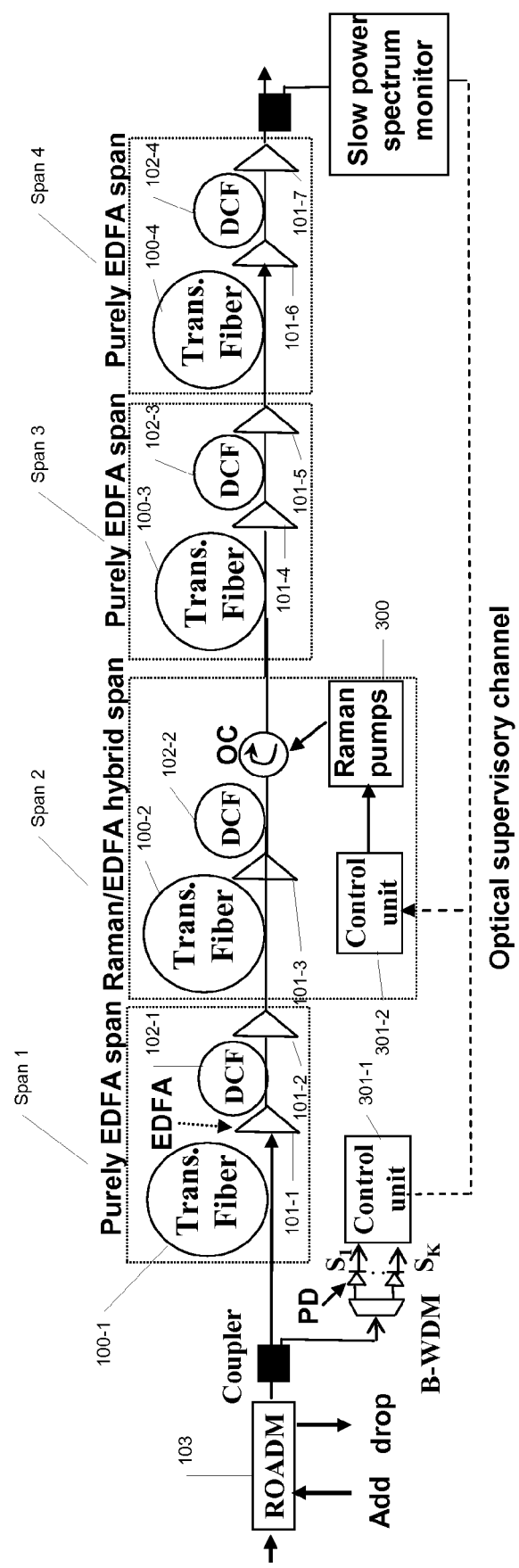
FIG. 5 shows a second embodiment of the invention utilized in an exemplary four span system using a backward-pumped discrete RFA (Raman pumps) in the second span with a feed-forward dynamic gain control circuit (the feed-forward signals being remotely monitored) to control the overall Raman tilt transients from multiple spans.

In FIG. 3, we show a forward-pumped discrete RFA 300 to compensate the Raman tilt. As an alternative, a backward-pumped discrete RFA (Raman pumps 300) may also be used to compensate the Raman tilt as is illustrated in FIG. 5 where OC represents an optical circulator located after the DCF 102-2 of the second span. The method shown FIG. 5 exhibits a slower control speed than the method shown in FIG. 3 but is more robust to polarization-related issues.

Figure 6:
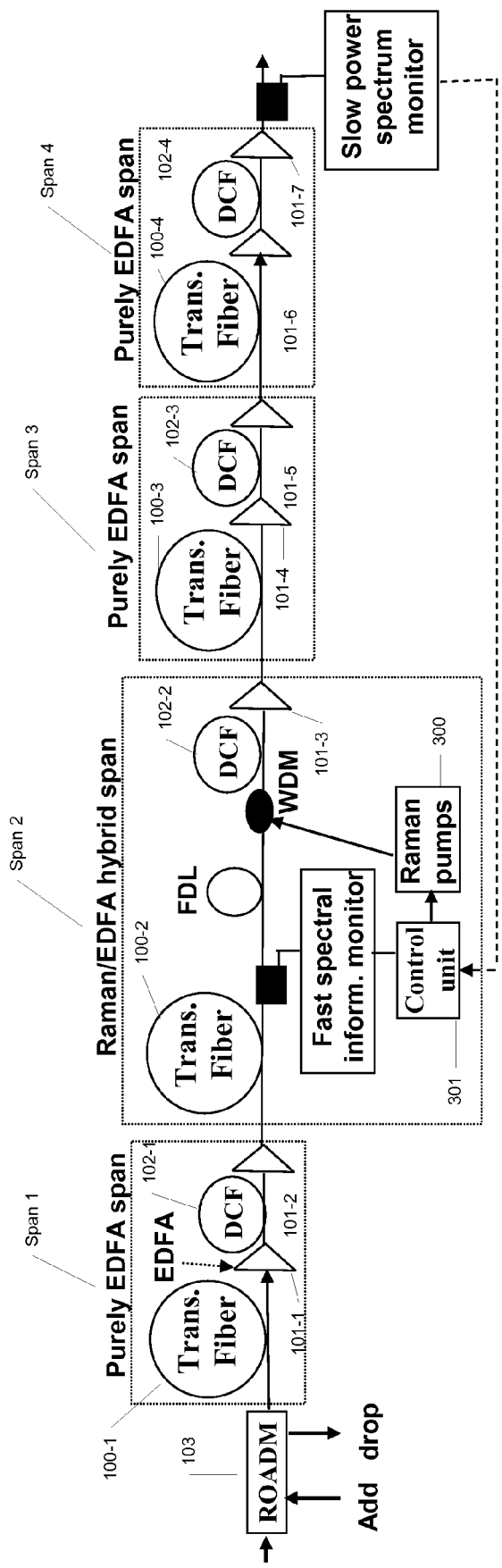
FIG. 6 shows a third embodiment of the invention using a forward-pumped discrete RFA (Raman pumps) in the second span with a feed-forward dynamic gain control circuit (feed-forward signals being monitored right before the RFA) to control the overall Raman tilt transients from multiple spans; in this embodiment a fiber delay line (FDL) is introduced in the second span for fast signal monitoring which may be a hybrid span and a DCF is shown after the WDM.
Figure 7:
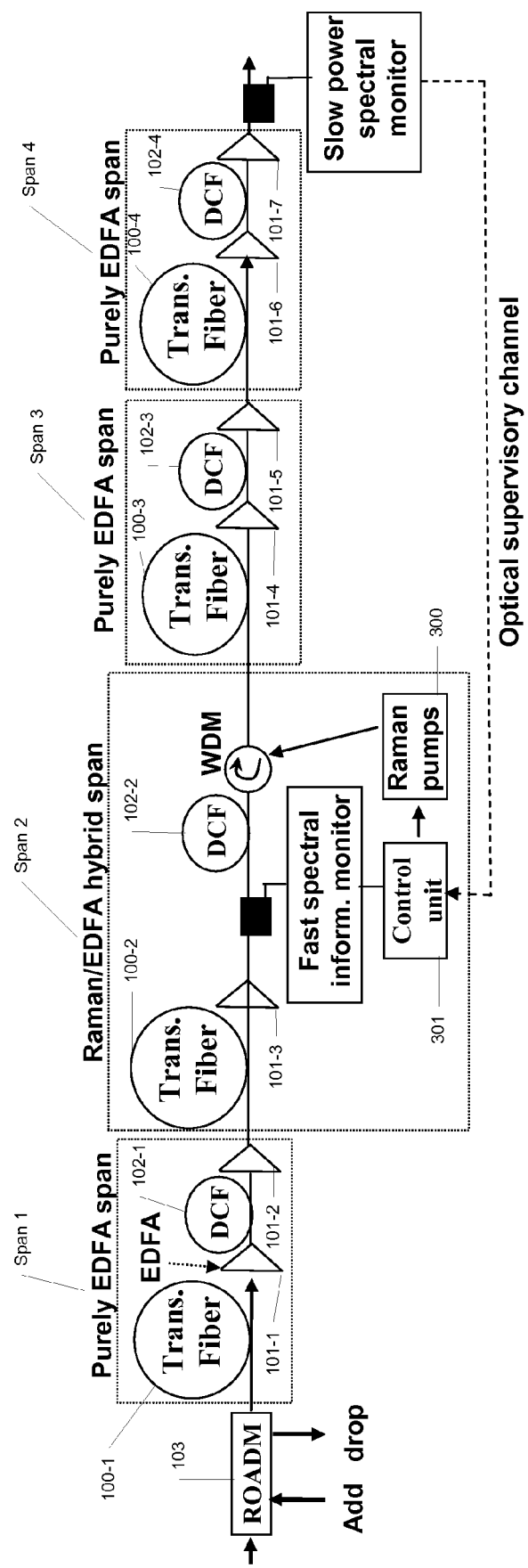
FIG. 7 shows a fourth embodiment of the invention using a backward-pumped discrete RFA (Raman pumps) in the second span with a feed-forward dynamic gain control circuit (feed-forward signals being monitored right before the RFA) to control the overall Raman tilt transients from multiple spans; in this embodiment, a DCF is shown before the WDM optical circulator.

In FIG. 6 and FIG. 7, there are shown another two embodiments of the invention, where the feed-forward signals are monitored right before the RFA 300 in the second span by using a fast spectral information monitor. The fast spectral information monitor may be the same as that shown in FIG. 3 (monitoring the total signal powers in several wavelength regions), but it may also be a fast channel monitor in which the signal powers in several individual wavelength channels are monitored. For the case with a forward-pumped RFA (Raman Pumps) 300 (according to FIG. 6), a short fiber delay line FDL (for example, of a few hundreds of meters) with a time delay equal to the time delay introduced by the control branch may be introduced in the transmission branch to enhance the control speed. During channel add/drop or other cause of transient tilt, the power of each of the Raman pumps 300 may also be adjusted using the linear equation of Equation 1 given above. For these two cases, $S_L(k,t)$ may denote the detected input signal power in the $k^{th}$ wavelength region or in the $k^{th}$ signal channel. For the embodiment of FIG. 6, T≅0. But T is approximately equal to the propagation time in the DCF 102-2 for the embodiment of FIG. 7.

When the span loss is large or the DCF length is short, the gain provided by the RFA (Raman pumps 300) may not large enough to completely replace one of the EDFA 101. In this case, two EDFA's may be used in the hybrid EDFA/Raman span such as span 2; (the required gain from one of the two EDFAs is smaller than that required in an EDFA-only span). For the case that there is no DCF 102 in the transmission span (e.g. a fiber Bragg grating (FBG, not shown) is used as the dispersion compensator) or the DCF length is short, a distributed RFA (using the transmission fiber as the gain medium) or a combination of a distributed RFA and a discrete RFA with the same feed-forward dynamic gain control circuit as is shown in FIGS. 3, 5, 6 and 7 may also be used to perform Raman tilt transient control. In addition, although the proposed feed-forward control technique is advantageously used to control the fast Raman tilt transients, the traditional feedback-based control method (such as PID-based control method) with a fast channel monitor may also be used to control the Raman tilt transients depending on specific applications and system requirements as is shown in the respective embodiments of the invention shown in FIGS. 8 and 9. Furthermore, a combination of the proposed feed-forward control technique and the traditional feedback-based control technique with a fast channel monitor may also be used to control Raman tilt transient under some circumstances with higher performance requirement.

The gain medium used for the discrete RFA 300 may be conventional DCF 102 as is shown in the above embodiments. It may also be other special high nonlinear fibers such as high nonlinear photonic crystal fibers (or photonic bandgap fibers) or a combination of conventional DCF 102 and other special high nonlinear fibers. In addition, the discrete DCF 102 may be in a one-stage design as is illustrated in the above embodiments, it may also be in a multi-stage design, in which the Raman gain fiber is divided into more than one stage separated by an isolator and each stage may be either a forward-pumped RFA or a backward-pumped RFA. The Raman pump may be a narrow-band Raman pump such as FBG-stabilized Fabry-Perot (F-P) laser, Raman fiber laser or multi-frequency distributed feedback (DFB) lasers. It may also be a broadband Raman pumps such as an incoherent Raman pump. For the case of using a broadband Raman pump, a fast spectral filter may be required to perform fast output Raman pump spectrum control.

The basic idea of this invention is also applicable to the common EDFA/Raman hybrid-systems and even some all Raman systems using only backward-pumped RFAs at each span. In accordance with the present invention, very fast tilt transients due to inter-channel SRS effects from multiple spans of transmission fibers and DCFs in these WDM systems may be controlled by using a forward-pumped RFA, which may be introduced by replacing or partly replacing an EDFA/a backward-pumped RFA. The present invention is also applicable to an optical transmission system using other rare-earth-doped fiber amplifier (e.g. praseodymium-doped optical amplifier) as well as semiconductor optical amplifier and optical parametric amplifier.

Figure 9:
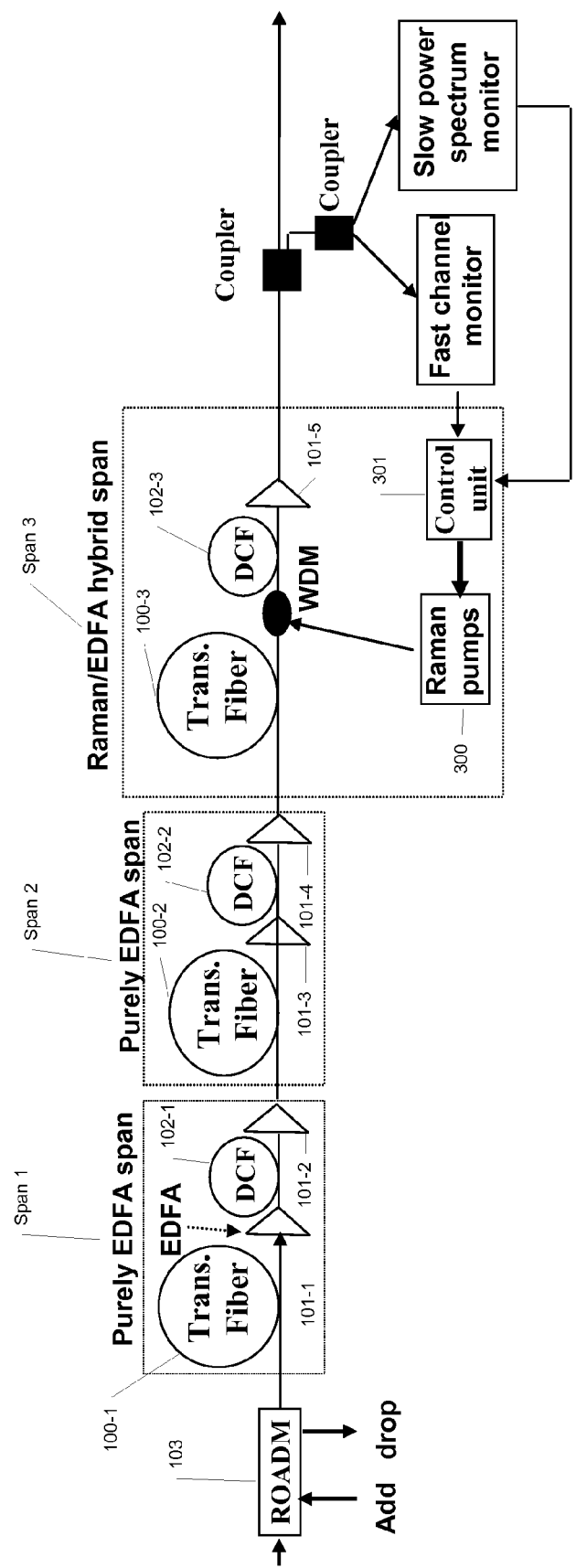
FIG. 9 shows a sixth embodiment of the invention using a backward-pumped discrete RFA (Raman pumps) in the third span with a feedback-based dynamic gain control circuit to control the overall Raman tilt transients from multiple spans.
Figure 10:
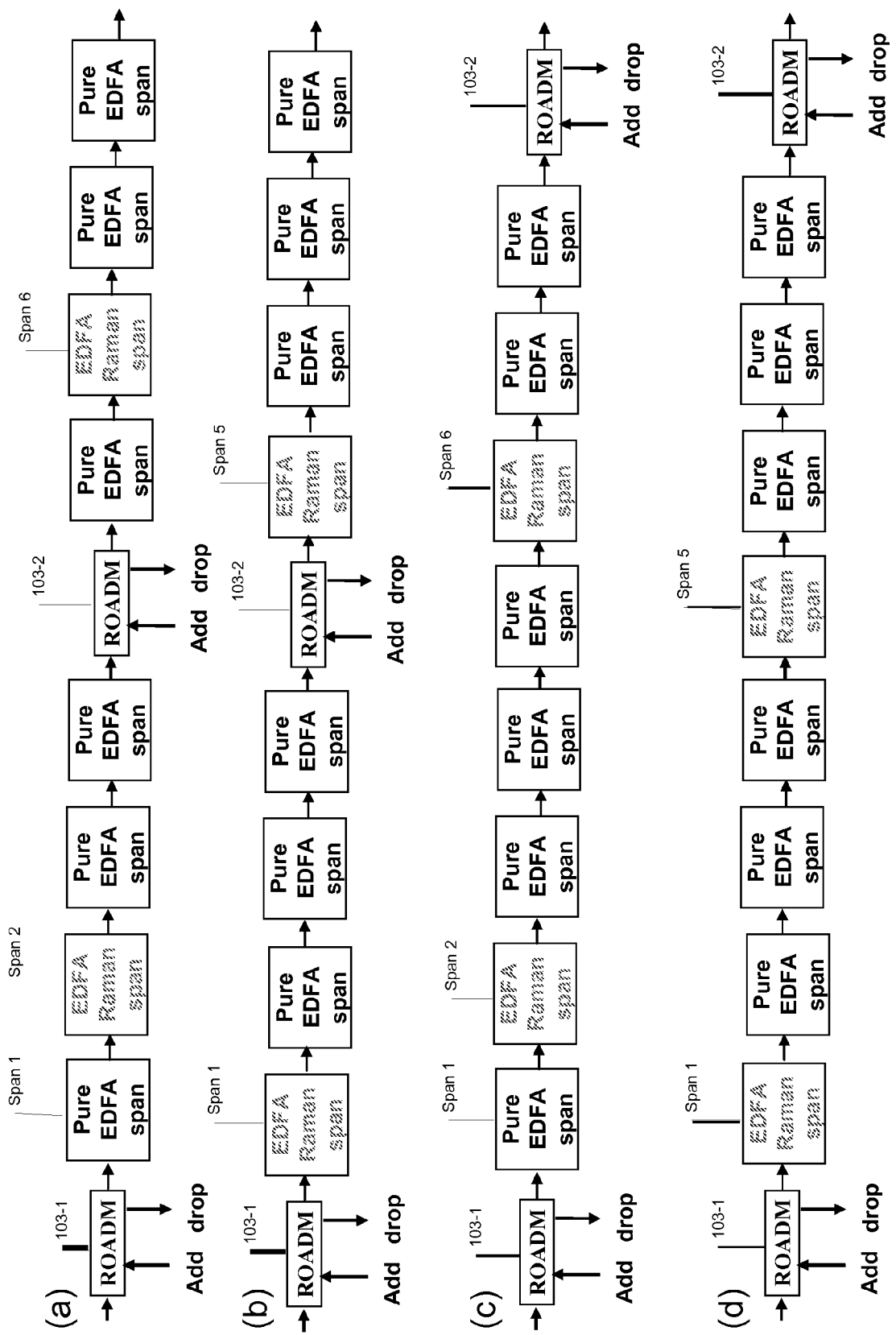
FIG. 10(a)-(d) show block schematic drawings for four exemplary long haul WDM systems and, in particular, placements for an EDFA/Raman span in which one of the embodiments of FIGS. 3 and 5-9 or equivalent embodiments may be employed and the relation of such a span to the location of an ROADM; a multitude of alternative embodiments for placing an ROADM differently in relation to an EDFA/RAMAN span are possible.

As described above, in a conventional hybrid EDFA/Raman long haul system, the proximity of a hybrid span in which transient tilt control is provided to an ROADM 103 may vary according to system design criteria. SRS tilt may depend on the types of transmission fiber used, the input signal power, channel patterns and a host of other factors. Permissible accumulated tilt before tilt compensation is useful may depend on any of these factors and, in addition, the total number of spans and margin allocation. Referring to FIG. 10, four exemplary long haul systems are depicted in block schematic diagram format. In FIGS. 10(a)-10(d), only two ROADM's 103-1 and 103-2 are shown in exemplary eight span WDM hybrid systems. It has already been suggested that a middle span be selected for Raman transient tilt control. FIG. 10(a) shows an EDFA/Raman span with transient tilt control according to FIG. 3 or 4-9 as the second span following the ROADM 103-1 or the second span (span 6) following the ROADM 103-2. Alternatively, the EDFA/RFA span is shown in FIG. 10(b) as immediately following the ROADM's 103-1 or 103-2 as spans 1 and 5 respectively. FIG. 10(c) shows ROADM's 103-1 and 103-2 separated by eight spans. In this case, transient tilt control and the EDFA/Raman spans are shown as spans two and six. In a similar case shown in FIG. 10(d), hybrid EDFA/Raman spans with transient tilt control are seen as spans one and five following ROADM's 103-1 and 103-2 respectively. Other alternative long haul system designs are possible within the spirit of the invention without limitation except to when it becomes desirable to compensate for transient or static tilt, for example, every fourth span in a hybrid or even in some Raman only systems.

Figure 8:
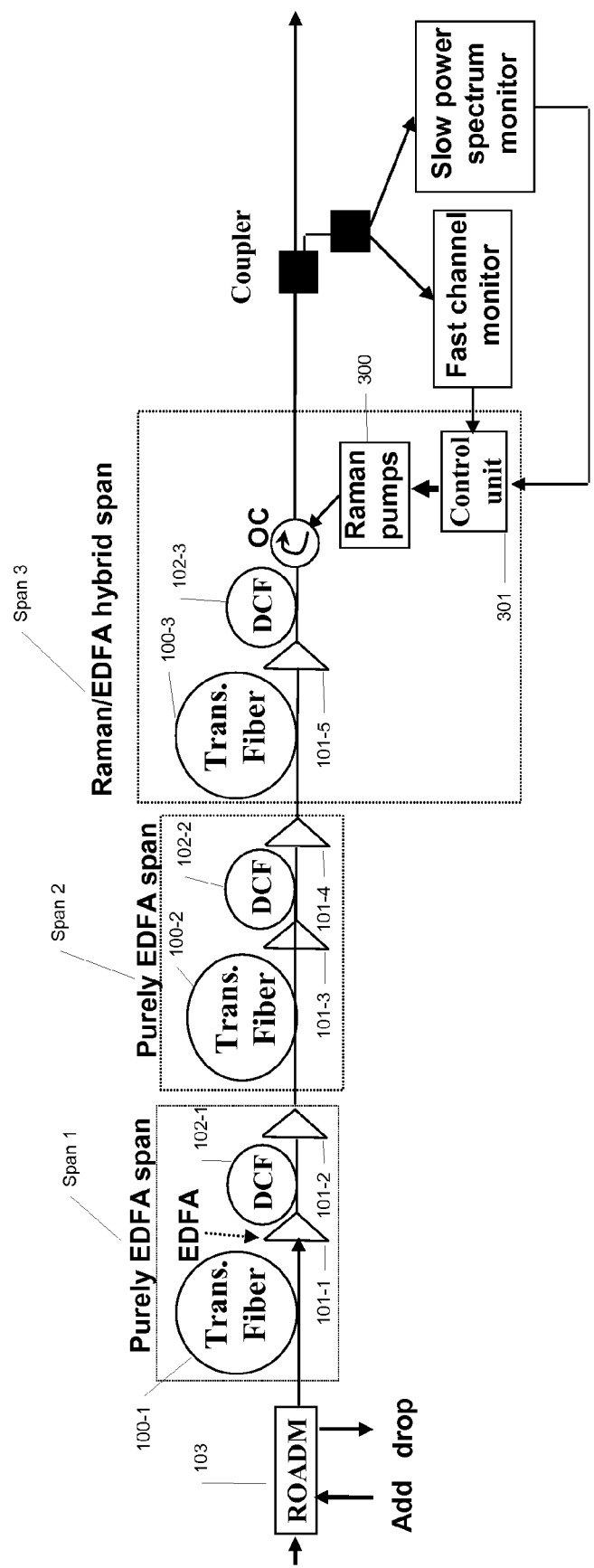
FIG. 8 shows a fifth embodiment of the invention using a forward-pumped discrete RFA (Raman pumps) in the third span with a feedback-based dynamic gain control circuit to control the overall Raman tilt transients from multiple spans.

As discussed herein, an EDFA/Raman hybrid system (or an all Raman system) can achieve both cost-effective optical transmission as well as fast tilt transient control, enabled by a simple feed-forward control technique. In the embodiments of FIGS. 8 and 9, feedback may be utilized in place of feed-forward. Moreover, both forward and backward-pumped RFA's may be used with a tilt control circuit in accordance with the invention. In the presently preferred system, hybrid EDFA and RFA are used in only a small number of spans while EDFA's are used as the predominant optical amplifiers in most of the spans. Because each RFA is used to control the tilt transients generated from multiple spans and the introduced RFA not only performs the function of the replaced EDFA as an optical amplifier but also performs dynamic gain equalization functions, a long haul fiber optic transmission system may be more cost-effective than the prior art by adding stand-alone dynamic tilt compensators into a EDFA-only WDM system. The basic idea of this invention is also applicable to the common EDFA/Raman hybrid systems and even to some all Raman systems where only backward-pumped RFAs are used at each span to enhance Raman tilt transient control speed. The invention has been described with reference to a number of embodiments and variations described of

What we claim is:

1. In a multi-span, multi-channel optical fiber transmission system, a method of controlling amplifier gain in the presence of transient events across multiple transmitted channels comprising inserting a Raman fiber amplifier having an associated feed-forward control circuit into the multi-span, multi-channel optical fiber transmission system, monitoring optical signal power for input to the feed-forward control circuit, adjusting a transient event compensation speed of the feed-forward control circuit inserted into the optical fiber transmission system, monitoring said optical signal power at two different wavelengths, and monitoring the first and second wavelengths at the feed-forward control circuit comprising first and second control units and transmitting a control signal via an optical supervisory channel to said second control unit for the Raman fiber amplifier.

2. A method as recited in claim 1 wherein the transient event compensation speed is determinable by a propagation time from a point of monitoring optical signal power to a point of introducing gain control.

3. A method as recited in claim 1, wherein the multi-span, multi-channel optical fiber transmission system comprises at least one rare earth doped fiber optic amplifier per span.

4. A method as recited in claim 3, wherein at least one rare earth doped fiber optic amplifier comprises an Erbium doped fiber optic amplifier.

5. A method as recited in claim 3, wherein the multi-span, multi-channel optical fiber transmission system comprises at least three spans including a span for inserting the Raman fiber amplifier and associated feed-forward control circuit, the span for Raman fiber amplifier and control circuit insertion comprising a middle span of the at least three spans.

6. A method as recited in claim 1 wherein the Raman fiber amplifier is a forward-pumped Raman fiber amplifier.

7. A method as recited in claim 1 wherein the Raman fiber amplifier is a backward-pumped Raman fiber amplifier.

8. A method as recited in claim 1, the multi-span, multi-channel optical fiber transmission system comprising a preponderance of Raman amplifiers among multiple spans, a middle span having the Raman amplifier and associated feed-forward control circuit.

9. A method as recited in claim 3, two spans of the multi-span system further comprising a length of dispersion compensation fiber.

10. A method as recited in claim 1, a span of the multi-span including the Raman fiber amplifier further comprising a fast spectral information monitor.

11. A method as recited in claim 10, the span including the Raman fiber amplifier further comprising a fiber delay line.

12. A method as recited in claim 1 further comprising monitoring output power via a slow spectral monitor for outputting said control signal to the second control unit of the feed-forward control circuit.

13. A method as recited in claim 10 further comprising monitoring output power via a slow spectral monitor and providing a control signal to the feed-forward control circuit for the Raman fiber amplifier.

14. A method as recited in claim 1, further comprising, during transient events, adjusting power of each pump of the Raman fiber amplifier according to a linear equation.

15. A method as recited in claim 1, wherein the transient event compensation speed is dependent upon a linear control coefficient.

16. A method as recited in claim 1, wherein a transient event comprises a tilt transient event.

17. In a multi-span, multi-channel optical fiber transmission system, a method of controlling amplifier gain in the presence of transient events across multiple transmitted channels comprising inserting a Raman fiber amplifier having an associated feed-forward control circuit into the multi-span, multi-channel optical fiber transmission system, monitoring optical signal power for input to the feed-forward control circuit, adjusting a transient event compensation speed of the feed-forward control circuit inserted into the optical fiber transmission system and, during transient events, adjusting power of each pump of the Raman fiber amplifier according to a linear equation, wherein the linear equation comprises:

$$P_L(j,t) \approx P_{L0}(j) + \sum_{k=1}^{K} T_{LL}(j,k)[S_L(k, t-T) - S_{L0}(k)]$$

where $P_L(j,t)$ denotes a required pump power in a linear unit of a $j^{th}$ pump at time instant t, $S_L(k,t)$ denotes a detected input signal power in a $k^{th}$ wavelength region in the linear unit, $S_{L0}(k)$ and $P_{L0}(j)$ denote a corresponding input signal power and pump power at a reference operation point, T denotes a time delay between a required pump power adjustment for the Raman fiber amplifier and a detected input signal power variation at a monitoring point, and $T_{LL}(j,k)$ denotes a linear control coefficient.

* * * * *